US012608381B2

(12) United States Patent　(10) Patent No.:　US 12,608,381 B2
Messenger　(45) Date of Patent:　Apr. 21, 2026

(54) SYSTEM AND METHOD FOR EXECUTING COMPUTATIONAL QUERIES

(71) Applicant: Shopify Inc., Ottawa (CA)

(72) Inventor: Philip John Messenger, East Sussex (GB)

(73) Assignee: Shopify Inc., Ottawa (CA)

( * ) Notice: Subject to any disclaimer, the term of this patent is extended or adjusted under 35 U.S.C. 154(b) by 0 days.

(21) Appl. No.: 18/648,994

(22) Filed: Apr. 29, 2024

(65) Prior Publication Data

US 2025/0335447 A1　Oct. 30, 2025

(51) Int. Cl.
*G06F 16/00*　(2019.01)
*G06F 16/2452*　(2019.01)
*G06F 16/2455*　(2019.01)

(52) U.S. Cl.
CPC .. *G06F 16/24561* (2019.01); *G06F 16/24526* (2019.01)

(58) Field of Classification Search
CPC ..................... G06F 16/24561; G06F 16/24526
See application file for complete search history.

(56) References Cited

U.S. PATENT DOCUMENTS

| | | | | |
|---|---|---|---|---|
| 10,102,268 B1* | 10/2018 | Sivathanu | ............... | G06F 16/22 |
| 2007/0112736 A1* | 5/2007 | Okamoto | ............ | G06F 16/2454 |
| 2010/0125584 A1* | 5/2010 | Navas | ............... | G06F 16/24568 |
| | | | | 707/747 |
| 2010/0169381 A1* | 7/2010 | Faunce | ............. | G06F 16/24534 |
| | | | | 707/E17.054 |
| 2011/0119245 A1* | 5/2011 | Sargeant | ............. | G06F 16/9024 |
| | | | | 707/706 |
| 2014/0095445 A1* | 4/2014 | Deshmukh | ........ | G06F 16/24544 |
| | | | | 707/661 |
| 2018/0121482 A1* | 5/2018 | Heen | .................... | G06F 16/2358 |
| 2020/0081693 A1* | 3/2020 | Moussa | ..................... | G06F 8/42 |
| 2022/0238193 A1* | 7/2022 | Koc | ........................ | G16H 15/00 |

* cited by examiner

*Primary Examiner* — Syed H Hasan

(74) *Attorney, Agent, or Firm* — CPST Intellectual Property Inc.; Brett J. Slaney

(57) ABSTRACT

A computer system and computer-implemented method are provided for executing computational queries. The method includes executing a query comprising at least one predicate, each predicate determining whether each of a plurality of entities is a member of a corresponding set for that predicate. The method also includes storing a bitset indicating set membership for the entities at each node in a graph representative of the query, wherein the bitset stored at a terminal vertex in the graph provides an output indicative of set membership for the query.

20 Claims, 9 Drawing Sheets

130

Determine from an event that
membership of a bitset has changed

132

Recompute bitset for at least one
predicate and any connected nodes

120

Execute query

122

Provide output at intermediate node
without executing at least one predicate

SYSTEM AND METHOD FOR EXECUTING COMPUTATIONAL QUERIES

TECHNICAL FIELD

The following generally relates to executing computational queries and, in particular, to storing bitsets at nodes in graphs representative of the queries to determine set membership for entities associated with the queries.

BACKGROUND

In conducting data management for users or other entities that interact with or otherwise utilize a software platform, administrators may create segments or categorize entities and their attributes based on database queries (e.g., SQL queries). These queries are traditionally static, executed at specific intervals, and may not provide real-time segment information. This approach may become increasingly inefficient with the growth of data volume and complexity.

BRIEF DESCRIPTION OF THE DRAWINGS

Embodiments will now be described with reference to the appended drawings wherein.

DETAILED DESCRIPTION

Figure 1:
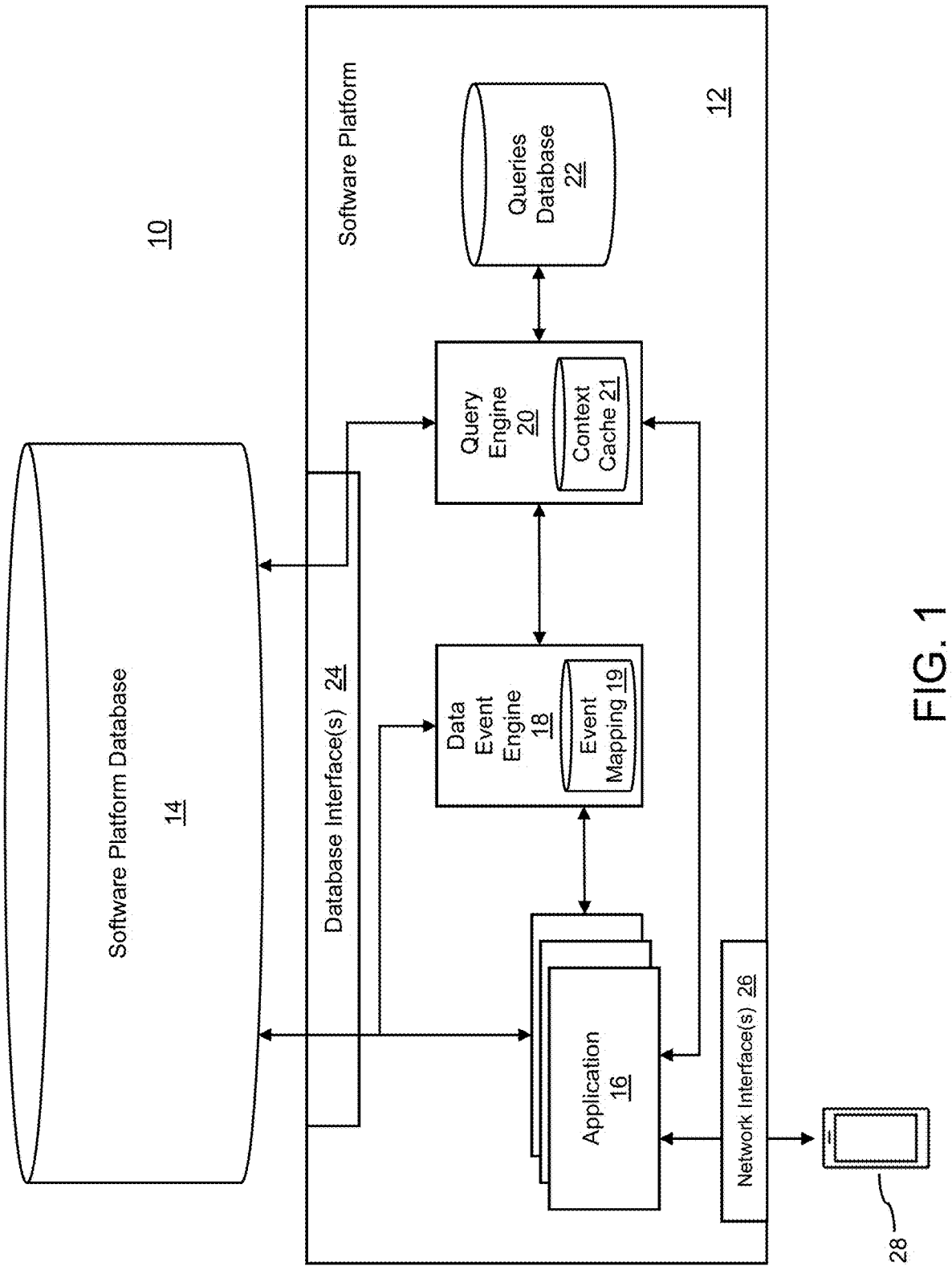
FIG. 1 is a is an example of a computing environment in which a software platform having access to a database.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It has been recognized that as entity data (e.g., user data) evolves, segments or other attributes may need to be recalculated using fresh data. This may include running all database queries every time a new event related to an entity is registered, which may not be feasible due to, for instance, high data write rates, data distribution across multiple database shards, and the sheer number of saved segments requiring query executions.

For example, in the realm of customer data management, merchants often create customer segments based on database queries (e.g., SQL queries). As noted above, these queries are traditionally static, executed at specific intervals, and may not provide real-time segment information. Moreover, this approach may become increasingly inefficient with the growth of data volume and complexity.

For a given query (e.g., a query that involves one or more database calls) the query may be broken down into a series of its predicates. Each predicate evaluates set membership for entities (e.g., customers) that are associated with the query. The predicates may be combined using Boolean operations to execute the query. The output of the query may then be applied to those entities that are part of the final set.

To enable more efficient storage and execution of the query, particularly when the membership involves a large number of entities, and/or is executed many times, a bitset indicative of set membership for the entities may be created and stored at each node in a graph that corresponds to the query to be executed. The bitsets are efficient ways of storing such set memberships and may be used in the Boolean operations to execute the query.

The bitsets may be "refreshed" (i.e., recomputed) at certain times, for example, periodically or to maintain a certain "freshness" of the data to account for changes that affect the entities in the corresponding bitsets.

With additional context, e.g., by having access to event data, the bitsets may be updated, and the query may be executed more selectively (or not at all), such that computations and subsequent database calls are reduced. Depending on the nature of the event data (e.g., whether specific values are indicated, whether changes are determinable, etc.), more selective recomputations are possible. Moreover, intermediate values, if known, may be saved to determine whether a predicate is satisfied. For example, if a predicate determines whether a value is greater than or equal to five and a current value associated with a change increases from three to four, recomputation may be avoided.

In a specific example, an application or service may employ a subscription manager, also referred to herein as a "data event engine", which monitors or subscribes or otherwise receives an incoming data stream of events, and maps specific types of data events to corresponding query predicates (or sub-clauses combining multiple predicates). On the first execution of a query, each predicate (and sub-clause) may be evaluated, and the result may be cached as a bitset. Each bitset represents the result of a predicate (at a leaf node) and the result of a sub-clause at an intermediate node.

When a data event is detected, the system may identify the predicates and/or sub-clauses that are affected by the change. Instead of re-executing the entire query, the system may only recompute the relevant sub-clauses using the cached bitsets. Bitsets offer an efficient way of storing cached results and may make caching the results of logical operations of multiple sub-clauses faster. By only recalculating the relevent bitsets, the system may significantly reduce computational waste and enhance the query execution performance.

The data events may be used to determine changes to a predicate for one or more of the entities associated with the query or may be used to determine changes to an individual entity across all predicates in the query. Either event type may affect one or more bitset for a given event and may propagate through multiple bitsets. Since the bitsets have a cardinality of one, the bitsets are both efficient to store, and to update/change/toggle. Moreover, when the associated Boolean logic includes certain operations, e.g., an AND operation, further propagation through the tree graph representative of the query may be avoided. Subsequent to updating the one or more bitsets affected by an event or event type, recomputation of the output at the terminal vertex in the graph may be performed by efficient bitset computations and may avoid more costly database calls.

In one aspect, there is provided a computer-implemented method, comprising executing a query comprising at least one predicate, each predicate determining whether each of a plurality of entities is a member of a corresponding set for that predicate; and storing a bitset indicating set membership for the entities at each node in a graph representative of the query, wherein the bitset stored at a terminal vertex in the graph provides an output indicative of set membership for the query.

In certain example embodiments, the method may further include recomputing the bitset of at least one node in the graph.

In certain example embodiments, all bitsets stored for the query are recomputed.

In certain example embodiments, the bitsets are recomputed periodically.

In certain example embodiments, the method further includes executing the query; and providing the output indicative of set membership for at least one of the plurality of entities, at an intermediate node in the graph, using the bitset stored at the intermediate node in the graph, without executing at least one predicate in the query adjacent to the intermediate node.

In certain example embodiments, a selected one or more of the bitsets are recomputed.

In certain example embodiments, the selected one or more bitsets are recomputed periodically.

In certain example embodiments, the selected one or more bitsets are recomputed in response to detecting events.

In certain example embodiments, the method further includes determining, from a particular event, that membership of a particular one or more of the bitsets has changed; and recomputing the bitset for at least one predicate and any connected nodes in the graph.

In certain example embodiments, the bitsets are recomputed in response to detecting an event, the event indicating that membership of a particular entity of the plurality of entities has changed, the method further including recomputing values in each bitset that correspond to the particular entity.

In certain example embodiments, the events comprise data indicative of changed values.

In certain example embodiments, at least one event is ignored based on a changed value.

In certain example embodiments, the method further includes comparing a recomputed bitset at the terminal vertex to a current bitset for the terminal vertex to determine whether the set membership for the query has changed; and responsive to determining that the set membership for the query has changed, modifying the output to apply the output to at least one entity of the plurality of entities.

In certain example embodiments, the comparing comprises an exclusive-OR operation applied to the recomputed and current bitsets to determine the at least one entity to which the output is applied.

In certain example embodiments, the method further includes mapping the bitset at the terminal vertex to a set of identifiers, the set of identifiers indicative of corresponding ones of the plurality of entities being members of the corresponding set; and applying the output to the corresponding ones of the plurality of entities.

In another aspect, there is provided a computer system comprising at least one processor and at least one memory. The at least one memory includes processor-executable instructions that, when executed by the at least one processor, cause the computer system to execute a query comprising at least one predicate, each predicate determining whether each of a plurality of entities is a member of a corresponding set for that predicate; and store a bitset indicating set membership for the entities at each node in a graph representative of the query, wherein the bitset stored at a terminal vertex in the graph provides an output indicative of set membership for the query.

In certain example embodiments, the computer system further includes processor-executable instructions that, when executed by the at least one processor, cause the computer system to: recompute the bitset of at least one node in the graph.

In certain example embodiments, a selected one or more of the bitsets are recomputed in response to detecting events and the computer system further includes processor-executable instructions that, when executed by the at least one processor, cause the computer system to: determine, from a particular event, that membership of a particular one or more of the bitsets has changed; and recompute the bitset for at least one predicate and any connected nodes in the graph.

In certain example embodiments, the computer system further includes processor-executable instructions that, when executed by the at least one processor, cause the computer system to: execute the query; and provide the output indicative of set membership for at least one of the plurality of entities, at an intermediate node in the graph, using the bitset stored at the intermediate node in the graph, without executing at least one predicate in the query adjacent to the intermediate node.

In another aspect, there is provided a computer-readable medium comprising processor executable instructions that, when executed by a processor of a computer system, cause the computer system to execute a query comprising at least one predicate, each predicate determining whether each of a plurality of entities is a member of a corresponding set for that predicate; and store a bitset indicating set membership for the entities at each node in a graph representative of the query, wherein the bitset stored at a terminal vertex in the graph provides an output indicative of set membership for the query.

Turning now to the figures, FIG. 1 illustrates an example of a computing environment 10. The computing environment 10 in this example includes a software platform 12, which may be adapted as a SaaS platform such as, for example, an e-commerce platform, a media distribution platform, a security infrastructure platform, etc.

The software platform 12 includes or otherwise has access to a software platform database 14. The database 14 may include one or more database tables or shards, libraries, data storage elements or any other allocation of memory used to store data, access such data, and enable mutations of such data. The software platform 12 may communicate with, or otherwise be coupled to, one or more computing devices 28, in this example depicted as a personal electronic device such as a smart phone. It can be appreciated that only a single computing device 28 is shown in FIG. 1 for illustrative purposes and various numbers of such devices 28 may be coupled to the software platform 12 via, for example, a network or other electronic communication connection.

The entities and elements shown in FIG. 1 may therefore communicate or otherwise be coupled to each other via one or more communication connections, which may utilize one or more short- or long-range communication network protocols, described by way of example below.

The software platform 12 in this example includes, among other things not shown for ease of illustration, one or more applications 16, which are hosted or otherwise provided by the software platform 12. At least one of the applications 12 may be coupled to the software platform database 14. For example, the application 16 may provide data and/or service (s) to entities via a computing device 28, of which data is accessed from and/or retrieved from the database 14. In the example shown in FIG. 1, multiple applications 16 are shown for illustrative purposes, however, it can be appreciated that the software platform 12 may be configured to provide a single application 16 or multiple applications 16, e.g., for providing multiple types of services or to provide access to data in the database 14 for multiple corresponding purposes.

The application(s) 16 may be interacted with by entities using a computing device 28, via one or more network interfaces 26. The application(s) 16 may communicate with the database 14 via one or more database interfaces 24. It can be appreciated that the network interface(s) 26 may enable communication via one or more networks. Such network connections are described further below in connection with FIG. 5.

The software platform 12 in this example also includes a data event engine 18 that may determine whether certain events associated with an application 16 have occurred. Although not shown in FIG. 1, such events may be indicated (e.g., broadcast) via an event bus or other data bus to subscribers of the events, event types, sources, etc.; e.g., via an event monitoring system utilized by the software platform 12. The data event engine 18 in this example utilizes an event mapping 19 to determine whether a detected event triggers an action such as execution of a query, e.g., of the database 14.

The data event engine 18 may be coupled to a query engine 20, which may be configured to execute queries of the database 14, e.g., in order to determine whether entities associated with data stored in the database (e.g., users, customers, targets, etc.) belong to a set, i.e., to determine set membership associated with such entities.

The query engine 20 may be coupled to the database 14 via a database interface 24 to perform a query determined from a queries database 22. For example, the query engine 20 may be utilized periodically to determine whether certain entities are members of a set based on the logic built into a certain query. A query may include evaluation of data stored in the queries database 22 and/or evaluation of data in the database 14 via database queries.

In certain example embodiments, it can be appreciated that the queries described herein may, additionally or alternatively, include calls to other third party entities or sources not shown in FIG. 1 for ease of illustration. The queries database 22 may include the query logic and other data associated with the corresponding query, as described further below.

The query engine 20 may include a context cache 21. The context cache 21 may be utilized to maintain contextual information relevant to a query. The contextual information may be static or dynamic. For example, dynamic contextual information may include information that changes based on events detected and processed by the data event engine 18 and communicated to the query engine 20. The query engine 20 may be coupled directly to an application 16 or may be coupled to an application 16 via the data event engine 18.

To enable more efficient storage and execution of a query in the queries database 22, particularly when the membership involves a large number of entities, and/or is executed many times, a bitset indicative of set membership for the entities may be created and stored at each node in a graph that corresponds to the query to be executed. The bitsets are efficient ways of storing such set memberships and may be used in the Boolean operations to execute the query. The query engine 20 may be configured to execute a query from the queries database 22 periodically, according to events detected by the data event engine 18 or based on some other trigger as illustrated by various examples described herein.

Figures 2A, 2B:
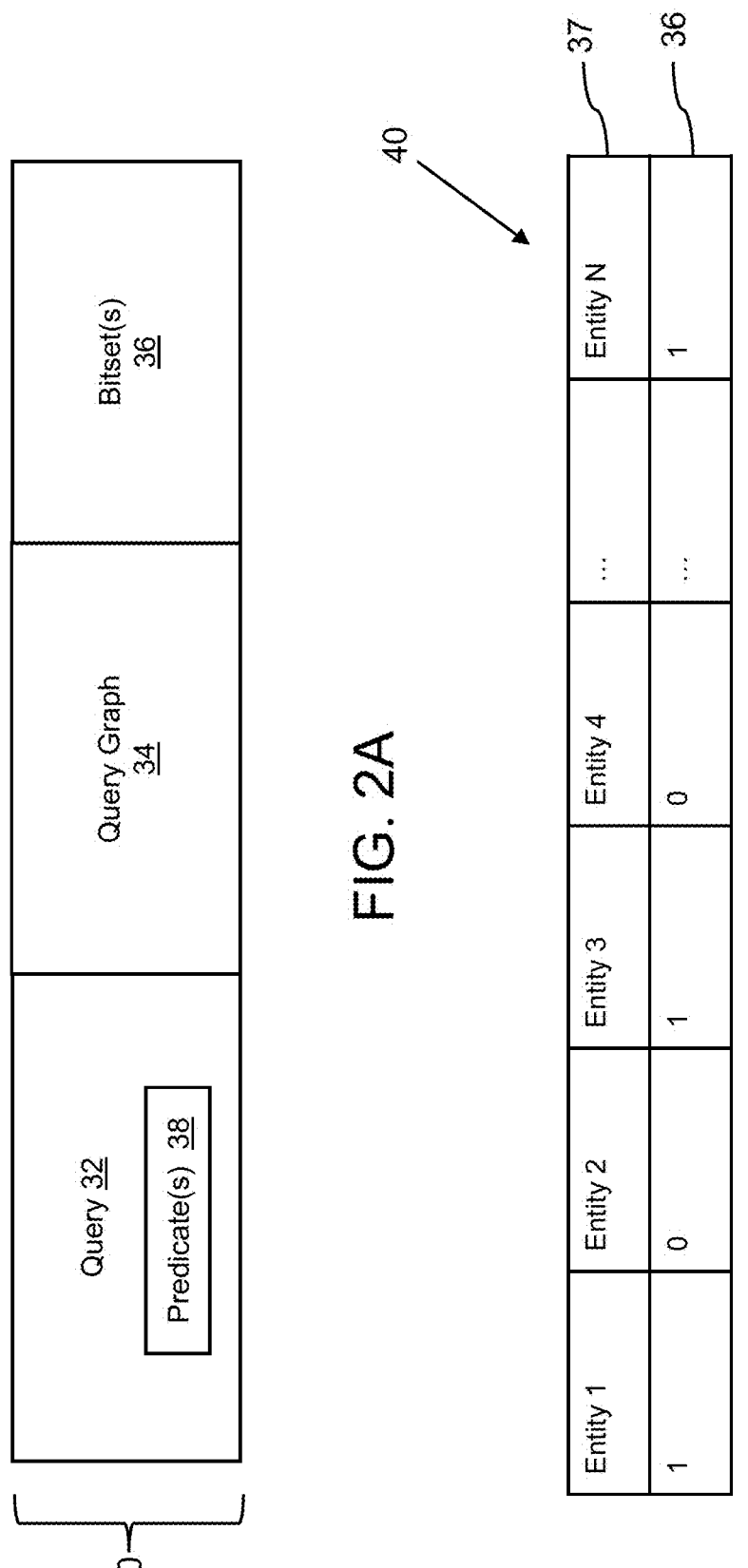
FIG. 2A is a block diagram illustrating an entry in a queries database.
FIG. 2B is a block diagram illustrating a mapping between a bitset and a set of entity identifiers.

Referring now to FIG. 2A, a block diagram illustrating an entry 30 in the query database 22 is shown. The entry 30 may include a query 32 and a query graph 34 providing a graphical representation of the query 32 and its predicates 38 according to the logic associated with the query 32. The entry 30 may also include the bitsets 36 that are stored in association with each node in the query graph 34 to indicate set membership for the set of entities for which the query 32 is being executed (e.g., a customer segment).

FIG. 2B illustrates a table 40 that provides a visualization of an entity mapping 37 for a bit set 36. In this example, the bitset 36 provides an indication of set membership for an arbitrary N number of entities, namely Entity 1, Entity 2, Entity 3, Entity 4, . . . , Entity N. For each column in the 1×N array used to store the bitset 36, a zero or a one (i.e., a bit) is used to indicate whether the entity mapped to that entry belongs to the set associated with the bitset 36. The bitset 36 shown in FIG. 2B includes an example set of entries for illustrative purposes. For example, if the bitset 36 in FIG. 2B represents those users having permission to access a particular service, of the entities shown, Entity 1, Entity 3 and Entity N belong to that set and can access that service, while Entity 2 and Entity 4 do not belong to that set and cannot access that service at that time. The entity mapping 37 applies to all bitsets 36 and predicates 38 associated with the query 32 and thus may be stored separately by the query engine 20 and need not be stored for each bitset 36. As such, the table 40 shown in FIG. 2B includes the entity mapping 37 alongside a bitset 36 for illustrative and visualization purposes and bitsets 36 may be stored without the mapping 37.

By having the entity mapping 37 available to the query engine 20, set membership may be determined on an entity-by-entity basis. This allows the query engine 20 to determine to which entities an output of the query 32 applies, as well as enable the query engine 20 to selectively update the bitsets 36 based on events related to specific entities rather than the entire set each time.

Figure 3:
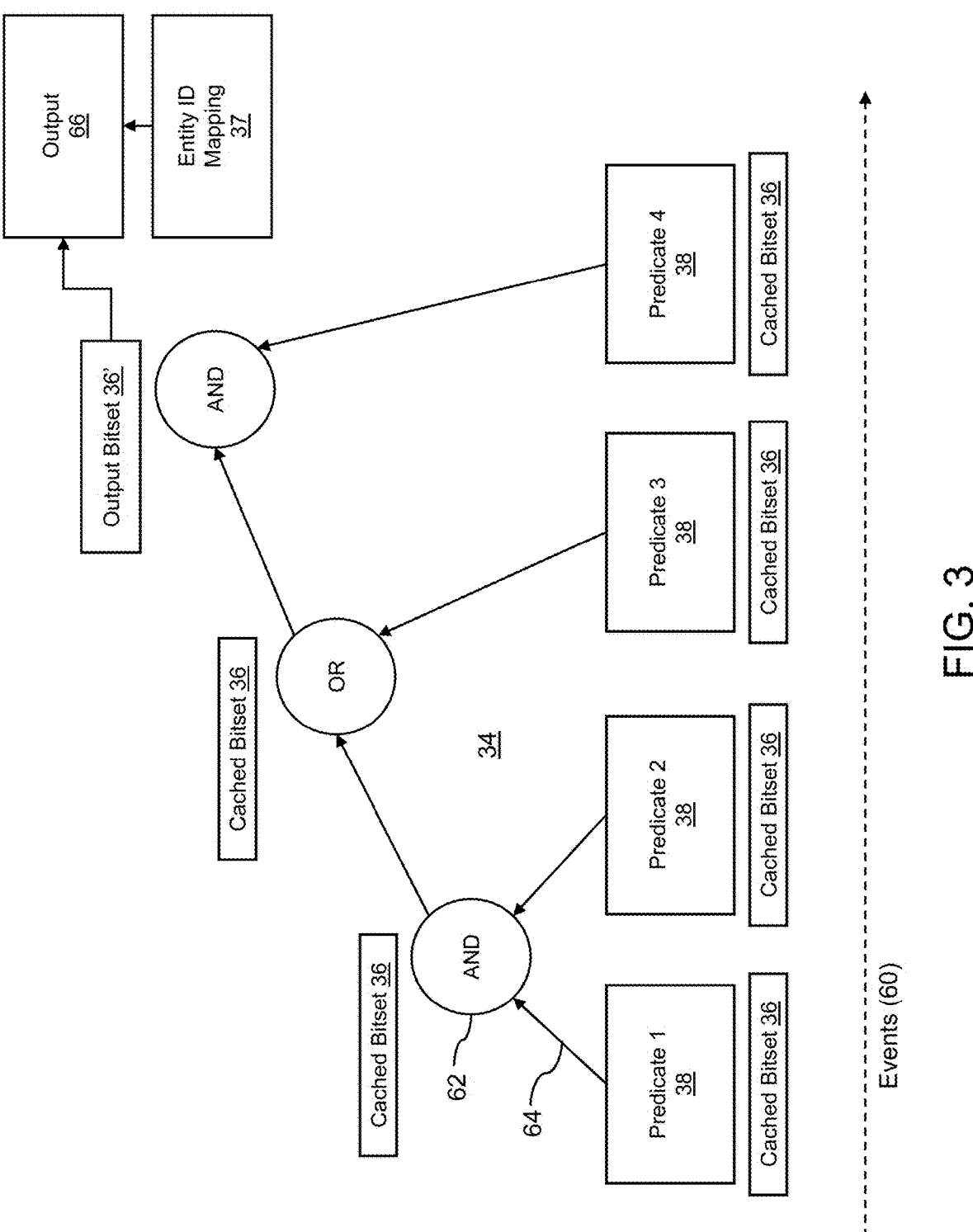
FIG. 3 illustrates an example of a graph representing a query.

Referring now to FIG. 3, a graphical representation of a query 32 is shown, referred to above as a query graph 34. The query graph 34 in this example includes four predicates 38, namely Predicate 1, Predicate 2, Predicate 3, and Predicate 4. These four predicates 38 are executed according to the following example Boolean logic:

$$((\text{Predicate 1 AND Predicate 2) OR (Predicate 3)) AND (Predicate 4)} = \text{Output.}$$

Each predicate 38 represents an evaluation associated with the entities, that is, for example, a feature or attribute evaluated for the set of entities. A bitset 36 may be stored at each leaf node of the query graph 34, representative of the predicate 38. Each intermediate node 62 is associated with a stored bitset 36, which represents the output of an operator, determined based on the edges 64 in the query graph 34. For example, a first intermediate node 62 corresponds to an AND operator, which determines whether the entities satisfy both Predicate 1 and Predicate 2. The cached bitset 36 at the first AND node therefore represents the set membership for those entities that satisfy the predicates 38 on both sides of the node 62. In this example, Predicate 3 is used in an OR operation against the AND applied to Predicates 1 and 2. That is, to satisfy set membership to that point in the query graph 34, the entity may satisfy either Predicate 1 and Predicate 2 (i.e. both) or only Predicate 3. Each of the predicates 38 may therefore have different weights or levels of importance such that Predicate 3 may supersede the set membership associated with Predicates 1 and 2.

Predicate 4 in this example is evaluated against the result of the OR operation such that Predicate 4 is required to satisfy the output 66, which corresponds to an output bitset 36' at the terminal vertex corresponding to a second AND operator. The output 66 may therefore be determined from the output bitset 36' at the terminal vertex in the query graph 34 and the entity mapping 37 of identifiers (IDs) to enable the software system 12 to determine to which entities the output 66 should affect. For example, the entities may receive a notification, be given a change in status, qualify for a promotion, etc.

It can be appreciated that, so long as the attributes, parameters or other information or data evaluated at each predicate 38 does not change, the bitsets 36 may be used to generate the output 66 or intermediate outputs such as the set membership for a predicate 38 or sub-clause comprising multiple predicates 38. The bitsets 36 may be updated to ensure the set membership does not become stale, inaccurate or out-of-date, which may be performed with additional efficiencies by leveraging event detection and the compact representations provided by the bitsets 36.

While the bitsets 36 may be updated periodically or according to some other parameter, the bitsets 36 may be updated according to events 60 detected by the data event engine 18. The query engine 20 may be notified of the events 60 (i.e., events may be pushed to query engine 20), may subscribe to topics posted by the event engine 18 (e.g., may be determined via a subscription to an event fabric) and which are associated with the events 60, or may request events 60 periodically (i.e., pull events). As noted above, the data event engine 18 may utilize the event mapping 19 to determine which events 60 to capture and/or process, and whether the query engine 20 has subscribed to such events 60. It can be appreciated that the functionality of the data event engine 18 may, alternatively, be implemented by the query engine 20 and thus the delineation between these elements as shown in FIG. 1 is for illustrative purposes.

Figure 4:
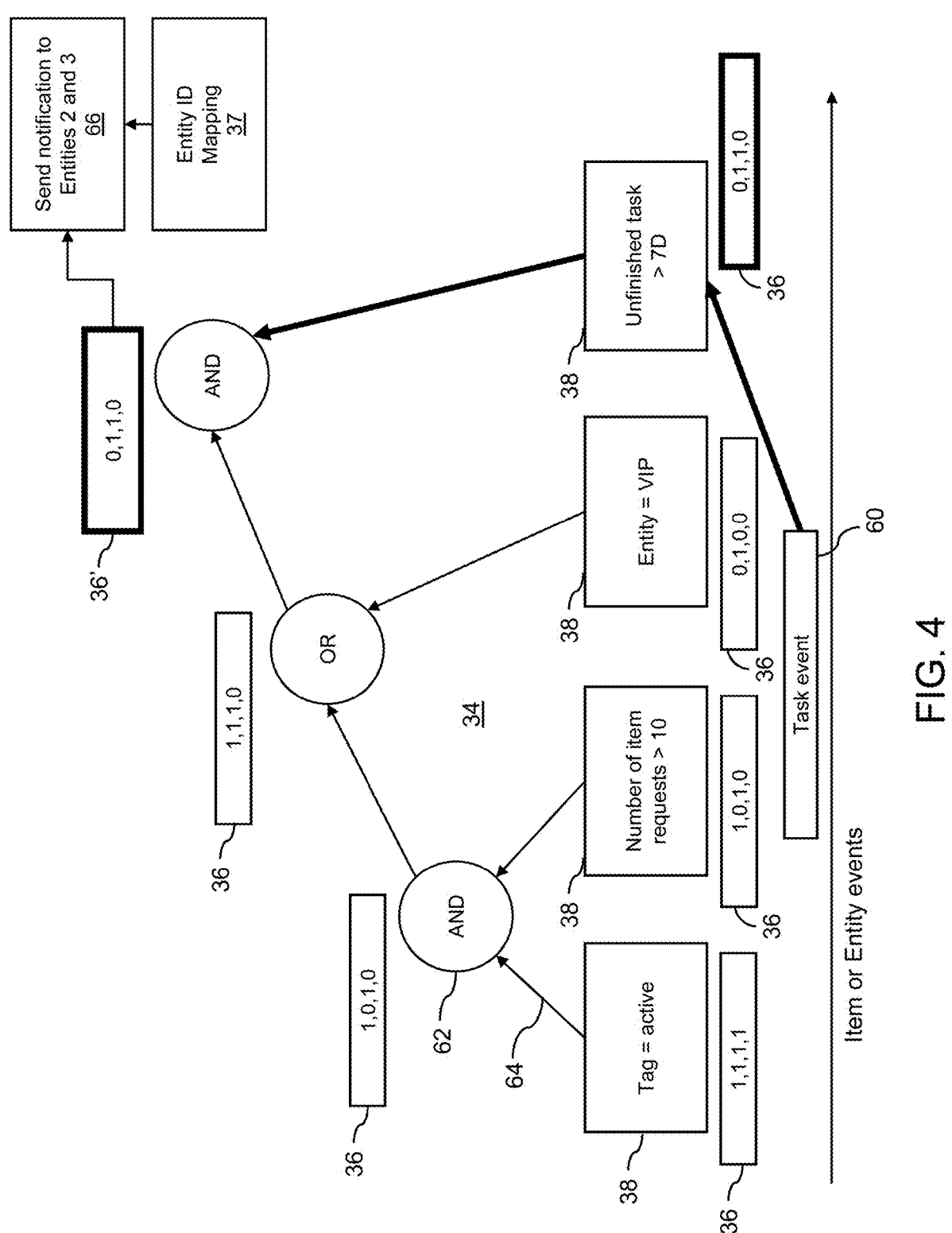
FIG. 4 illustrates an example of a graph representing a query related to determining notifications to be sent to a set of entities.

FIG. 4 illustrates a specific example for determining whether a set of entities should receive a notification (e.g., a reminder related to a task), applied to the four predicates 38 and the query 32 shown in FIG. 3. For ease of illustration, the query 32 relates to a set of four entities and thus each bitset 36 includes a one-dimensional array of four bits. These entities may be referred to using the bitset notation or as Entity 1, Entity 2, Entity 3, and Entity 4.

In this example, Predicate 1 determines whether a certain "Tag" is set as "active". For instance, the set membership associated with this predicate 38 is indicative of whether the entities are active in the software platform 12 or active with a particular application 16. In this case, all four entities are active and the bitset 36 for Predicate 1 stores the following bits: [1, 1, 1, 1]. Predicate 2 in this example determines whether the number of item requests by an entity is greater than ten. For this illustrative example, an item request may refer to an action that may be taken by an entity with respect to an application 16 or the software platform 12 more generally, e.g., representative of a number of downloads via the application 16. In the example shown, the bitset 36 stored in association with Predicate 2 is [1, 0, 1, 0], indicating that only Entity 1 and Entity 3 have requested more than ten items.

The first AND operator evaluating Predicates 1 and 2 may therefore store a bitset [1, 0, 1, 0] since only Entity 1 and Entity 3 satisfy both Predicate 1 and Predicate 2. Predicate 3 in this example determines whether the entities are of a certain entity type, namely a very important person/party (VIP). If so, this entity type may supersede the result of Predicates 1 and 2 due to the OR operator. That is, since Entity 2 is a VIP entity in this case, the bitset 36 associated with the result of the OR operator is [1, 1, 1, 0] since only Entity 4 is neither active and having made more than ten requests, nor a VIP entity.

The final predicate in this query graph 34, namely Predicate 4, determines whether or not an entity has left a task unfinished for more than seven days (7D). For example, the software platform 12 or an application 16 hosted by the platform 16 may wish to follow up with certain active entities, e.g., users or members that are actively engaged with the application 16 or platform 12, if certain inactivity is detected. The inactivity may be holding up a downstream workflow, may require new terms for an acquisition of items, or may relate to a commercial sale or campaign.

In this example, Predicate 4 is evaluated against the bitset 36 stored at the OR operator to determine the output bitset 36', which is used to determine which entities should receive the output 66. That is, for certain active or VIP users, once it is detected that a task has gone unfinished for more than seven days, the output 66 is generated to send a notification to those that belong to the set. In the example shown in FIG. 4, a task event 60 is detected, e.g., by subscribing to a task-related topic or by having the data event engine 18 send all task events 60 to the query engine 20. The task event 60 in this example is indicative of Entities 2 and 3 having left a task unfinished for more than seven days, denoted by the bitset 36 [0, 1, 1, 0], highlighted using a bold outline in FIG. 4. This bitset 36 is evaluated against the bitset 36 associated with the node of the query graph 34 that represents the OR operator, via a further AND operator, to determine an output bitset 36' of [0, 1, 1, 0].

Using the entity mapping 37, the query engine 20 may determine that Entities 2 and 3 should receive the notification as the output 66. The query engine 20 may generate the notification or may provide the output 66 or an instruction indicative of the output 66 to a notification service, e.g., within the application 16 or software platform 12 generally. In scenarios where the output 66 should only be sent a single time to each entity, the query engine 20 may wish to determine what has changed in the output bitset 36'. In such a scenario, by storing a copy of the previous output bitset 36' and using an exclusive OR (XOR) operator or some other delta function, the previous and current/new output bitset 36' may be combined to determine which bits have changed and thus which entities have joined the set membership and should receive the output 66.

The bitsets 36 shown in FIG. 4 represent a snapshot of the set membership for Entities 1-4. Additional task events 60 or other events 60 related to item requests, entity activity, and entity status, may be provided to (e.g., streamed to) the query engine 20 via the data event engine 18 or some other element or service within, or external to, the software platform 12. That is, the events 60 may originate or be determined from any suitable and relevant source both internal and external to the computing environment 10 shown in FIG. 1.

The bitsets 36 may be computed a first time by executing the full query 32 and generating and storing bitsets 36 in association with nodes 62 in the graph 34 as well as at each predicate 38 (leaf nodes). As indicated above, set membership for the output bitset 36' and any intermediate bitset 36 may change periodically and require updates. These periodic changes may be frequent, or frequent for at least one predicate 38. The bitsets 36, 36' provide an efficient way to store and update set membership to determine the output 66 on an ongoing basis. For example, as the entities continue to engage with the software platform 12 and/or application(s) 16, their activity, number of item requests, status and tasks may continue to change. The query 32 may be run periodically to capture such changes (e.g., to maintain a "freshness" of the data) or may utilize access to events 60 to selectively update bitsets 36 rather than running the entire query 32.

For example, as shown in FIG. 4, an event 60 may relate to a single predicate 38 and thus only that predicate 38 would require updating and any propagation required based on the logic. In this example, since the unfinished task predicate 38 is one side of an AND operator and feeds the terminal vertex of the query graph 34 (i.e., the output bitset 36'), only the bitset 36 for Predicate 4 and, if necessary, the output bitset 36' would need to be updated. However, for a next event 60, e.g., related to the active Tag, if the event 60 indicates that Entity 2 is now inactive, since Predicate 1 is on one side of the OR operator, and the bitset 36 associated with the OR operator indicates that Entity 2 satisfies the other side of the OR operator, there is no need to further recompute bitsets 36 associated with the rest of the nodes 62. The example in FIG. 4 represents a simple example and thus only a single recomputation is saved, however, for larger query graphs 34, it can be appreciated that several or many additional recomputations may be saved by using bitsets 36 as described herein.

In other examples, an event 60 or set of events 60 may correspond to, or only affect, certain one or more predicates 38. In such cases, updates may be applied based to only those predicates 38, which may realize similar efficiencies as those discussed above in relation to updates on an entity-by-entity basis. For example, an event 60 that provides an update of the number of item request for all entities may be used to update the bitset 36 or Predicate 2. This update may propagate through the query graph 34 as discussed above.

At any level in the query graph 34, an intermediate output may be returned. For example, the query engine 20 may be used to determine if any new notifications should be sent to the entities. However, using the above, example, if the new event 60 does not change the bitset 36 stored in association with a predicate 38 on one side of an AND operator, it may be determined that no changes to the output bitset 36' would occur and thus the query engine 20 may cease executing. Moreover, any time that a bitset 36 is updated, the query engine 20 may compare the previous bitset 36 to the current/new bitset 36 using an XOR or some other delta function to determine what has changed. This may allow the query engine 20 to be used to both trigger entity-wide outputs 66 based on the output bitset 36' at the time of executing the query 32, or to trigger change-related outputs 66 based on changes to the output bitset 36'. Such change-related outputs 66 may, additionally or alternatively, be determined at a predicate level or intermediate node level and thus the query engine 20 may use the bitsets 36 to perform or evaluate sub-queries as well as full queries.

The query engine 20 may utilize the context cache 21 to realize further efficiencies by using contextual information to determine if bitsets 36 should be updated. For example, the context cache 21 may store a value associated with a bitset 36 that determines a quantity that increments, e.g., Predicate 4 that counts a number of inactive days. If the value is less than the trigger amount (e.g. 7 days) and an event 60 is indicative of an incrementation that, when applied, still does not satisfy the trigger amount, an update may be avoided. In the example shown in FIG. 4, the task event 60 may indicate that Entity 1 has an unfinished task for 5 days, incremented by one from 4 days. Since after the incrementation the task has not yet been unfinished for 7 days or more, the query engine 20 may ignore the event 60 with respect to Entity 1. Similar context may be stored with respect to the number of items requested (i.e. with respect to Predicate 2).

Figure 5:
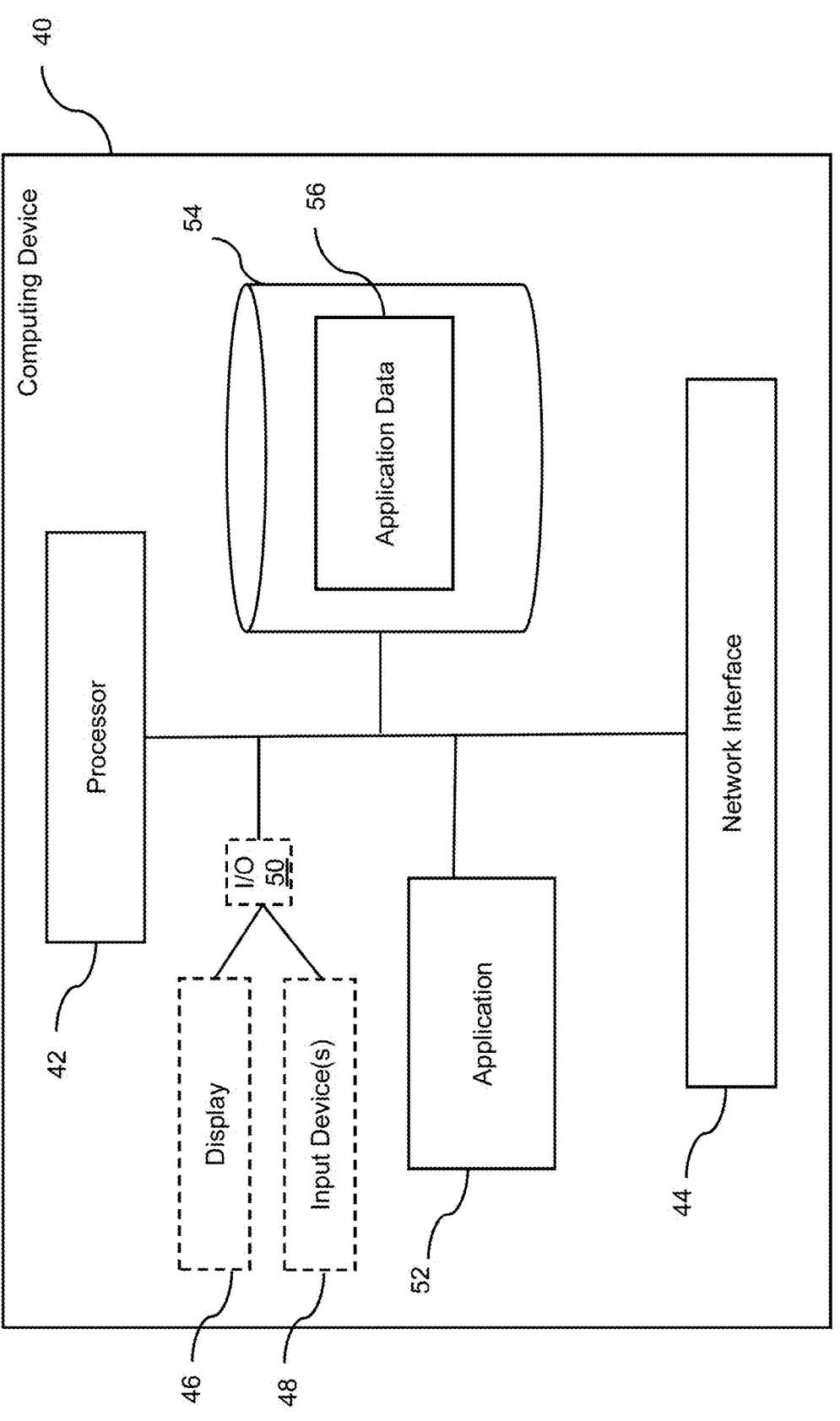
FIG. 5 is an example of a computing device operable to communicate in the computing environment.

FIG. 5 shows an example of a computing device 40 which may be utilized by any of the entities shown in FIG. 1, for example, a server used to provide the software platform 12 (e.g., server for application 16, data event engine 18, query engine 20), a tenant of the database 14, or client device 28, and be adapted for the corresponding role of that entity. In this example, the computing device 40 includes one or more processors 42 (e.g., a microprocessor, microcontroller, embedded processor, digital signal processor (DSP), central processing unit (CPU), media processor, graphics processing unit (GPU) or other hardware-based processing units) and one or more network interfaces 44 (e.g., a wired or wireless transceiver device connectable to a network via a communication connection). Examples of such communication connections can include wired connections such as twisted pair, coaxial, Ethernet, fiber optic, etc. and/or wireless connections such as LAN, WAN, PAN and/or via short-range communications protocols such as Bluetooth, WiFi, NFC, IR, etc.

The computing device 40 also includes an application 52, a data store 54, and application data 56. It can be appreciated that the application 52 may represent an application 16 provided by the software platform 12 to enable the computing device 40 to act as, for example, a client or user.

The data store 54 may represent a database or library or other computer-readable medium configured to store data and permit retrieval of data by the computing device 40. The data store 54 may be read-only or may permit modifications to the data. The data store 54 may also store both read-only and write accessible data in the same memory allocation. In this example, the data store 54 stores the application data 56 for the application 52 that is configured to be executed by the computing device 40 for a particular role or purpose.

While not delineated in FIG. 5, the computing device 40 includes at least one memory or memory device that can include a tangible and non-transitory computer-readable medium having stored therein computer programs, sets of instructions, code, or data to be executed by processor(s) 42. The processor(s) 42 and network interface(s) 44 are connected to each other via a data bus or other communication backbone to enable components of the computing device 40 to operate together as described herein. FIG. 5 illustrates examples of modules and applications stored in memory on the computing device 40 and executed by the processor(s) 42.

It can be appreciated that any of the modules and applications shown in FIG. 5 may be hosted externally and may be available to the computing device 40, e.g., via a network interface 44. The data store 54 in this example stores, among other things, the application data 56 that can be accessed and utilized by the application 52. The data store 54 may additionally store one or more software functions or routines in a cache or in other types of memory.

As shown in FIG. 5, the computing device 40 may, optionally (e.g., when configured as a user device 28), include a display 46 and one or more input device(s) 48 that may be utilized via an input/output (I/O) module 50. That is, such components may be omitted when the computing device 40 does not interact with a user.

Figure 6:
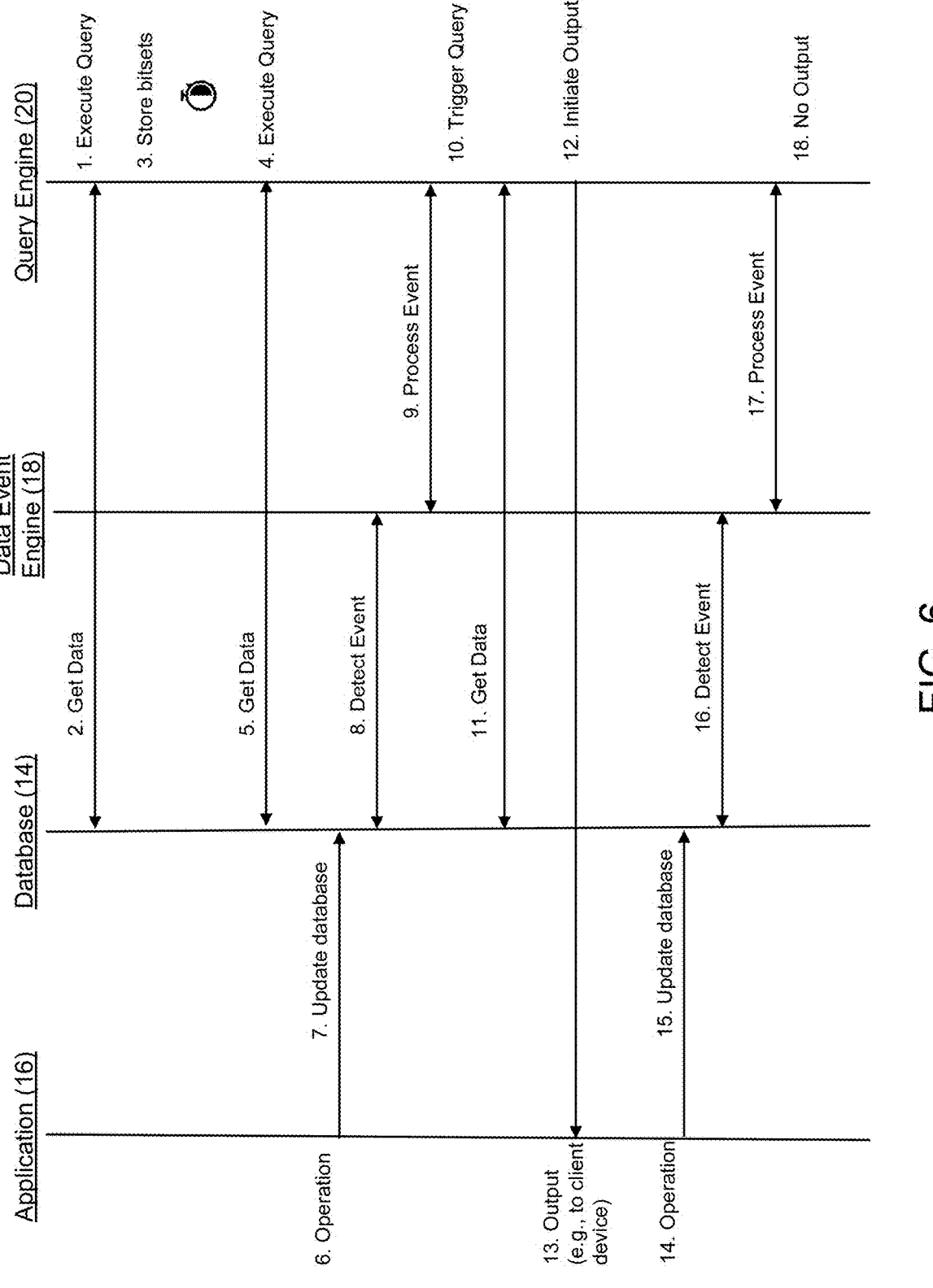
FIG. 6 is a sequence diagram illustrating example data queries between the software platform and the database.

FIG. 6 illustrates query execution in certain example scenarios to illustrate use of bitsets 36 by the query engine 20 to enable efficient determination of set membership for entities associated with data in the database 14. At step 1, the query engine 20 performs an initial execution of a query 32 from the query database 22. At step 2, the query engine 20 communicates with the database 14 to get data associated with the query 32. This may involve accessing multiple databases, tables, data partitions, or shards and therefore accessing the database 14 may represent any one or more database calls involved in executing the query 32.

At step 3, the query engine 20 generates and stores bitsets 36 indicative of set membership for entities associated with the query 32 (e.g., for a set of customers, users, clients, etc.). The bitsets 36 may be stored at each node 62 in a graph 34 representing the query 32 as described above. Once the bitsets 36 are generated and stored at an initial execution of the query 32, the bitsets 36 may be utilized to efficiently re-execute or re-evaluate the query 32 going forward.

Subsequent to step 3, FIG. 6 illustrates the passage of time to indicate that at some subsequent point in time (e.g., according to a freshness factor or in response to an event 60) the query 32 may be executed again at step 4. In this example, step 4 is executed after a certain amount of time elapses. At step 5, the query 32 may be executed to get data from the database 14. In this execution, an operation is performed at step 6, via the application 16. For example, based on the output bitset 36' stored at the terminal vertex in the graph 34 associated with the query 32, those entities belonging to the set may receive a notification, reminder, or have some other task performed. This may include updating the database 14 at step 7, e.g., to indicate that the entities in that set have received the notification.

As discussed above, the query engine 20 may use the bitsets 36 to efficiently perform query-related operations based on events 60. That is, the query engine 20 may also be triggered by events 60 detected by the data event engine 18. At step 8, the data event engine 18 detects an event 60 and, at step 9, processes the event 60. For example, the event engine 18 may detect that a certain one or more entities have subscribed to a service, or performed a certain action (e.g., a purchase, or accessing a webpage). The data event engine 18 may notify the query engine 20 when processing the event 60 at step 9 so as to trigger the query 32 at step 10. The query engine 20 may then get data from the database 14 at step 11, which initiates an output 66 at step 12. Initiating the output 66 in this example may have the application 16 trigger an output 66 at step 14 to client devices 28 of the entities belonging to the set at the terminal node of the graph 34. An operation may then be executed at step 14, e.g., similar to that executed at step 6, and the database updated at step 15.

Events detected by the data event engine 18 may also lead to no further execution of the query 32 being needed, or no further output 66 being executed. For example, the query engine 20 may determine, based on contextual information in the context cache 21, that the set membership has not changed. For example, an event 60 at step 16 indicative of a day elapsing may increment a counter, but not trigger an output 66 of the query 32. The event 60 may be processed at step 17, to indicate that the incrementation to a next day does not trigger an output 66 (e.g., that not enough days have elapsed before notifying the entity), and the query engine 20 opts to not execute the output 66 at step 18, or to at least only partially execute the query 32 as explained above.

Figure 7:
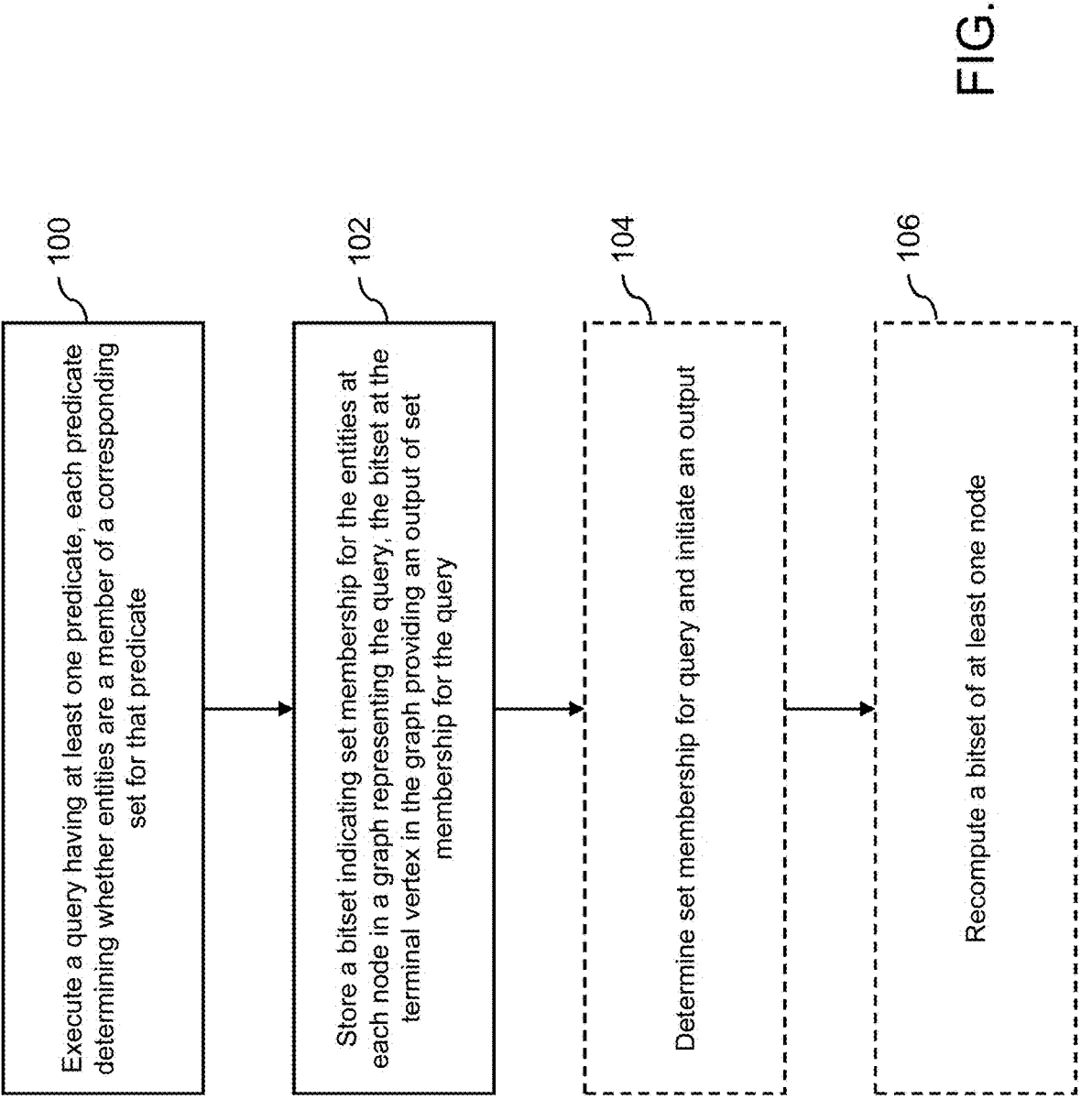
FIG. 7 is a flow chart illustrating example operations for executing computational queries by storing a bitset indicating set membership for the entities at each node in a graph representative of the query.

FIG. 7 is a flow chart illustrating example operations for executing computational queries by storing a bitset 36 indicating set membership for entities at each node in a graph 34 representative of a query 32. At block 100, the query engine 20 may execute a query 32 having at least one predicate 38, e.g., a query 32 such as that illustrated in FIGS. 3 and 4. At a first execution, the query 32 may include at least one database call to the database 14. Each predicate 38 determines whether entities are a member of a corresponding set for that predicate 38, e.g., whether the entity or something related to that entity satisfies some condition.

At block 102, the query engine 20 may store a bitset 36 indicating set membership for the entities associated with the query 32. As shown in FIG. 3, the bitset 36 may be stored at each intermediate node 62 in a graph 34 representing the query 32 and for each predicate 38 (i.e. leaf nodes). The bitset 36 at the terminal vertex in the graph 34, e.g., output bitset 36', provides an output of set membership for the entire query 32.

At block 104, the query engine 20 may use the output of block 102, e.g., the output bitset 36', to generate an output 36 that may be mapped to the entities using an entity mapping 37.

At block 106, the query engine 20 may recompute a bitset 36 associated with at least one node 62, e.g., in response to determining that an event 60 has occurred. The process performed in block 106 may repeat at block 104 for the same query 32, that is, to update the bitsets 36 according to events or to refresh the set membership at certain times or under certain conditions.

Figures 8, 9:
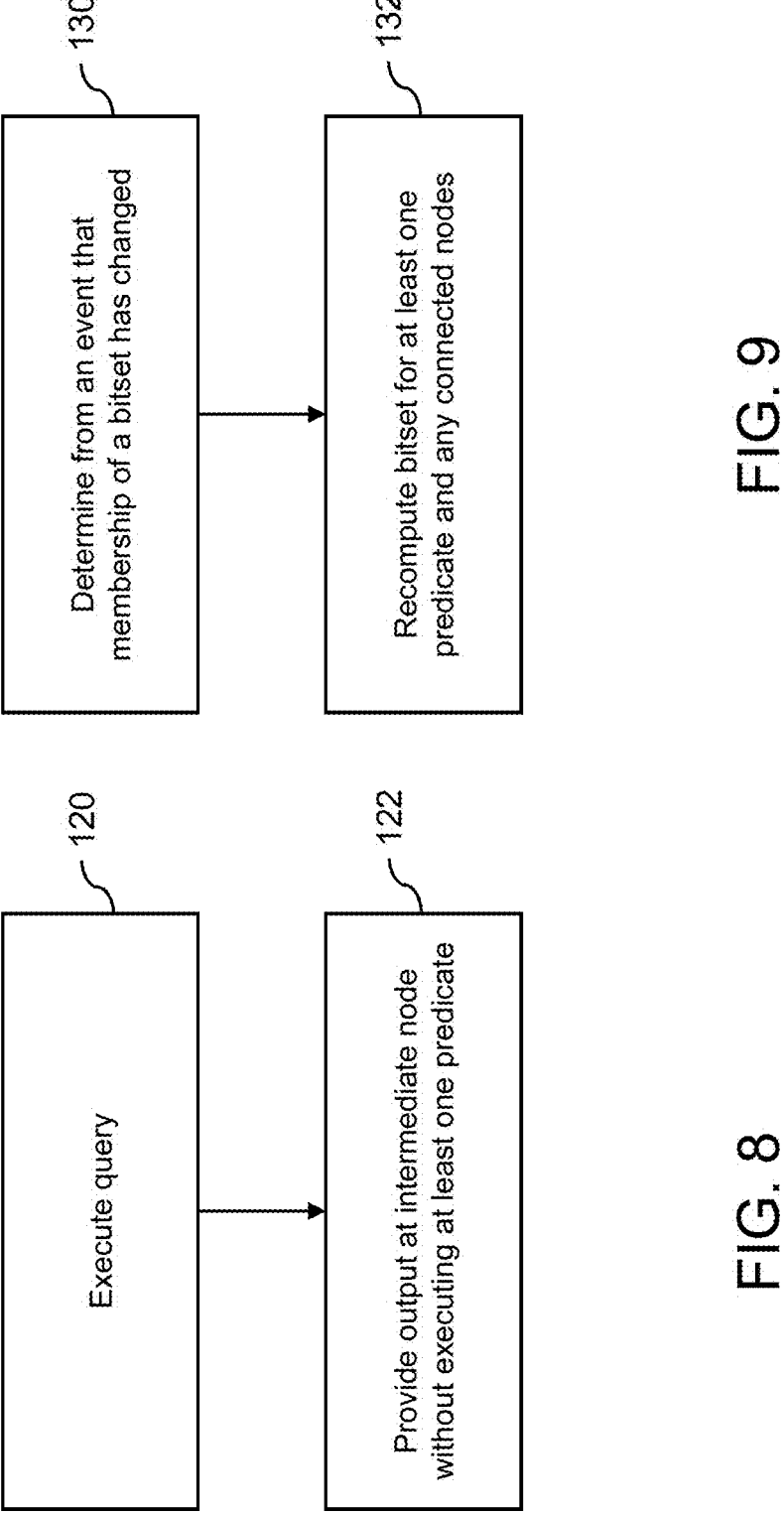
FIG. 8 is a flow chart illustrating example operations for providing an output to a query at an intermediate node without executing at least one predicate of the query.
FIG. 9 is a flow chart illustrating example operations for computing a bitset for a predicate based on a change detected from an event.

FIG. 8 is a flow chart illustrating example operations for providing an output to a query 32 at an intermediate node 62 without executing at least one predicate 38 of the query 32. At block 120, the query engine 20 executes a query 32, which may involve new database calls or evaluating the bitsets 36 stored in association with the predicates 38 and the intermediate nodes 62. At block 122, based on the bitsets 36 stored at the intermediate nodes 62, the query engine 20 may determine that an output may be provided at an intermediate node 62 without executing at least one predicate 38. For example, the query engine 20 may determine that based on an AND operation, either all or none of the entities belong to the set and thus an intermediate output may be provided without executing the entire query 32.

FIG. 9 is a flow chart illustrating example operations for computing a bitset 36 for a predicate based on a change detected from an event 60. At block 130, the query engine 20 (or the data event engine 18) determines from an event 60 that membership of a bitset 36 has changed. The event 60 may be associated with a single entity or an entire predicate 38. At block 132, the query engine 20 may recompute the bitset 36 for at least one predicate 38 and any connected nodes, e.g., at the intermediate nodes 62 based on the change in membership. For either a single entity or an entire set related to a predicate 38, this operation may propagate up the tree (represented by the graph 34) until it is determined whether an output 66 is affected or otherwise triggered or if a change requires a modified or additional output 66.

Figures 10, 11:
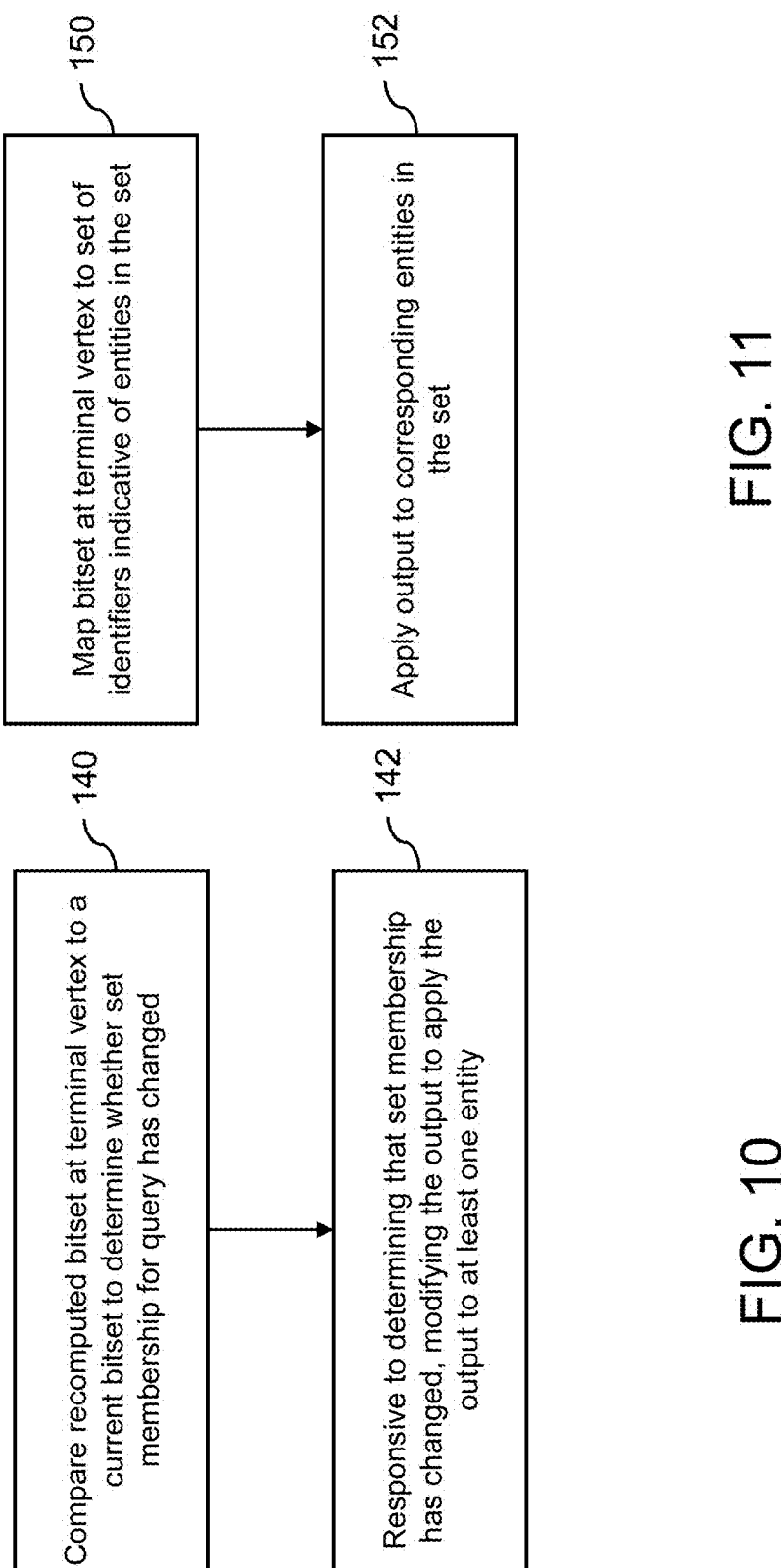
FIG. 10 is a flow chart illustrating example operations for determining changes in an output bitset and modifying an output accordingly.
FIG. 11 is a flow chart illustrating example operations for using an entity identifier mapping to apply an output to members in a set.

FIG. 10 is a flow chart illustrating example operations for determining changes in an output bitset 36' and modifying an output 66 accordingly. At block 140, the query engine 20, which has updated one or more of the bitsets 36, including the output bitset 36', compares the recomputed bitset 36 at the terminal vertex, i.e., the new output bitset 36' to a current output bitset 36' to determine whether there has been a change in set membership. For example, the updates may have only changed the bitset 36 for one entity and thus the output 66 may only need to be provided to that one entity. A delta of the two output bitsets 36' may be performed, e.g., by combining the bitset using an XOR operation to determine which have changed. The result of the XOR may then be used to determine a sub-list of entities to which the output 66 is to be directed at block 142.

FIG. 11 is a flow chart illustrating example operations for using an entity identifier mapping 37 to apply an output 66 to members in a set. At block 150, the query engine 20 may map the bitset 36 at the terminal vertex (i.e., the output bitset 36') to the set of identifiers indicative of entities in the set, i.e., using the mapping 37. At block 152, the query engine 32 applies the output 66 to the corresponding entities in the set, e.g., as shown in FIGS. 3 and 4.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method, comprising:
   executing a query comprising a plurality of predicates a first time, each predicate determining whether each of a plurality of entities is a member of a corresponding set for that predicate;
   storing a bitset indicating set membership for the entities at each node in a graph representative of the query, the nodes in the graph corresponding to Boolean operations to be applied to the bitsets associated with that node to combine the predicates in the query, wherein the bitset stored at a terminal vertex in the graph is indicative of a set membership for the query;
   executing the query a second time;
   using the bitset stored at the terminal vertex in the graph to determine the set membership; and
   using the set membership to initiate an output associated with corresponding entities of the plurality of entities, to complete the query executed the second time.

2. The method of claim 1, further comprising:
   recomputing the bitset of at least one node in the graph.

3. The method of claim 2, wherein all bitsets stored for the query are recomputed.

4. The method of claim 3, wherein the bitsets are recomputed periodically.

5. The method of claim 1, further comprising:
   providing the output indicative of a set membership for at least one of the plurality of entities, at an intermediate node in the graph, using the bitset stored at the intermediate node in the graph, without executing at least one predicate in the query adjacent to the intermediate node.

6. The method of claim 2, wherein a selected one or more of the bitsets are recomputed.

7. The method of claim 6, wherein the selected one or more bitsets are recomputed periodically.

8. The method of claim 6, wherein the selected one or more bitsets are recomputed in response to detecting events.

9. The method of claim 8, further comprising:
   determining, from a particular event, that membership of a particular one or more of the bitsets has changed; and
   recomputing the bitset for at least one predicate and any connected nodes in the graph.

10. The method of claim 3, wherein the bitsets are recomputed in response to detecting an event, the event indicating that membership of a particular entity of the plurality of entities has changed, the method further comprising:
    recomputing values in each bitset that correspond to the particular entity.

11. The method of claim 8, wherein the events comprise data indicative of changed values.

12. The method of claim 11, wherein at least one event is ignored based on a changed value.

13. The method of claim 2, further comprising:

comparing a recomputed bitset at the terminal vertex to a current bitset for the terminal vertex to determine whether the set membership for the query has changed; and responsive to determining that the set membership for the query has changed, modifying the output to apply the output to at least one entity of the plurality of entities.

14. The method of claim 13, wherein the comparing comprises an exclusive-OR operation applied to the recomputed and current bitsets to determine the at least one entity to which the output is applied.

15. The method of claim 1, further comprising:

mapping the bitset at the terminal vertex to a set of identifiers, the set of identifiers indicative of corresponding ones of the plurality of entities being members of the corresponding set; and applying the output to the corresponding ones of the plurality of entities.

16. A computer system comprising:

at least one processor; and at least one memory, the at least one memory comprising processor-executable instructions that, when executed by the at least one processor, cause the computer system to:

execute a query comprising a plurality of predicates a first time, each predicate determining whether each of a plurality of entities is a member of a corresponding set for that predicate;

store a bitset indicating set membership for the entities at each node in a graph representative of the query, the nodes in the graph corresponding to Boolean operations to be applied to the bitsets associated with that node to combine the predicates in the query, wherein the bitset stored at a terminal vertex in the graph is indicative of a set membership for the query;

execute the query a second time;

use the bitset stored at the terminal vertex in the graph to determine the set membership; and use the set membership to initiate an output associated with corresponding entities of the plurality of entities, to complete the query executed the second time.

17. The computer system of claim 16, further comprising processor-executable instructions that, when executed by the at least one processor, cause the computer system to:

recompute the bitset of at least one node in the graph.

18. The computer system of claim 17, wherein a selected one or more of the bitsets are recomputed in response to detecting events and further comprising processor-executable instructions that, when executed by the at least one processor, cause the computer system to:

determine, from a particular event, that membership of a particular one or more of the bitsets has changed; and recompute the bitset for at least one predicate and any connected nodes in the graph.

19. The computer system of claim 16, further comprising processor-executable instructions that, when executed by the at least one processor, cause the computer system to:

provide the output indicative of a set membership for at least one of the plurality of entities, at an intermediate node in the graph, using the bitset stored at the intermediate node in the graph, without executing at least one predicate in the query adjacent to the intermediate node.

20. A non-transitory computer-readable medium comprising processor executable instructions that, when executed by a processor of a computer system, cause the computer system to:

execute a query comprising a plurality of predicates a first time, each predicate determining whether each of a plurality of entities is a member of a corresponding set for that predicate;

store a bitset indicating set membership for the entities at each node in a graph representative of the query, the nodes in the graph corresponding to Boolean operations to be applied to the bitsets associated with that node to combine the predicates in the query, wherein the bitset stored at a terminal vertex in the graph is indicative of a set membership for the query;

execute the query a second time;

use the bitset stored at the terminal vertex in the graph to determine the set membership; and use the set membership to initiate an output associated with corresponding entities of the plurality of entities, to complete the query executed the second time.

* * * * *